April 19, 1932.  D. L. ISHBIA  1,854,514
VARIABLE ILLUMINATED SIGN
Filed July 8, 1930   3 Sheets-Sheet 2
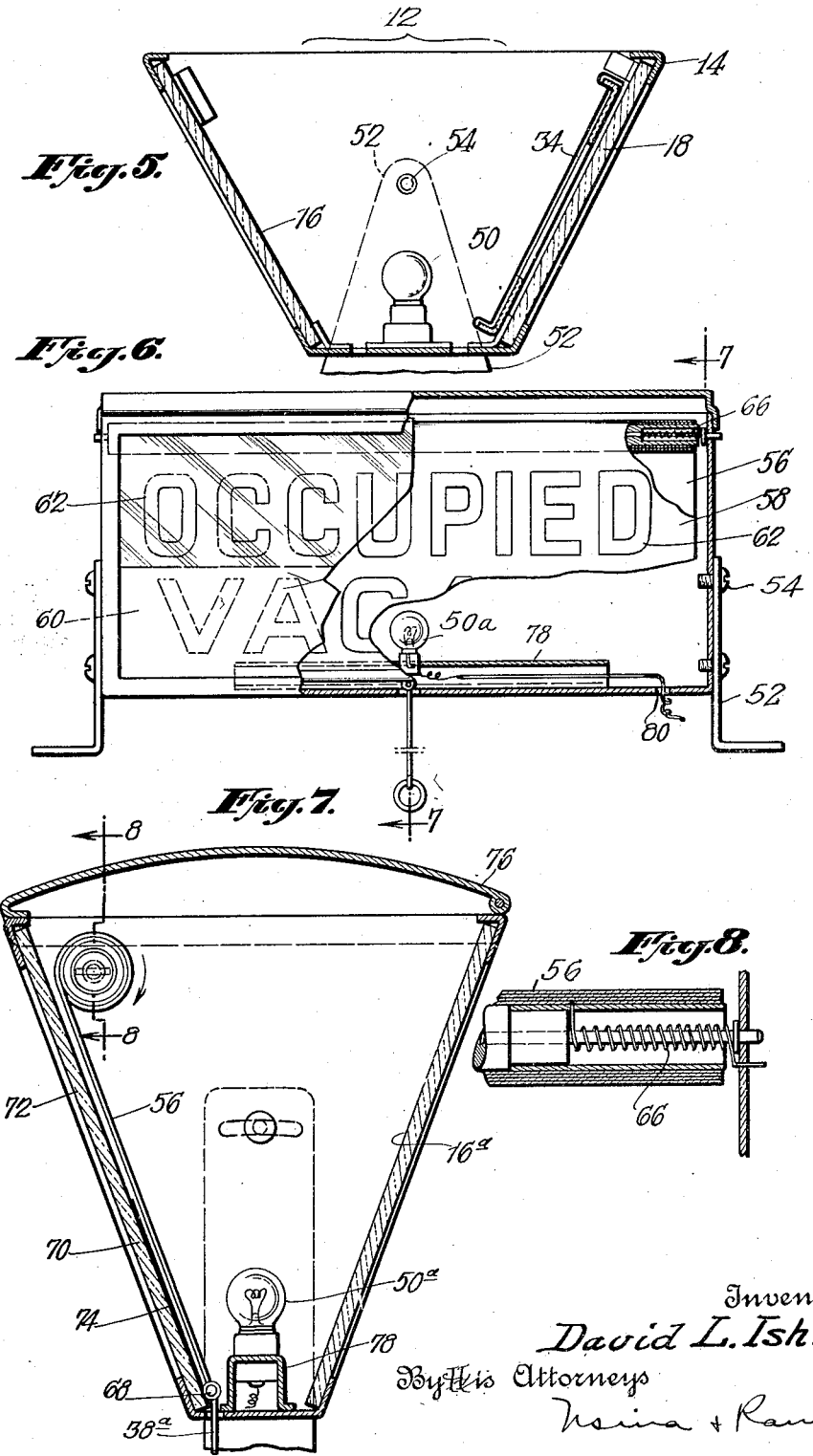
Inventor
David L. Ishbia
By his Attorneys April 19, 1932.  D. L. ISHBIA  1,854,514

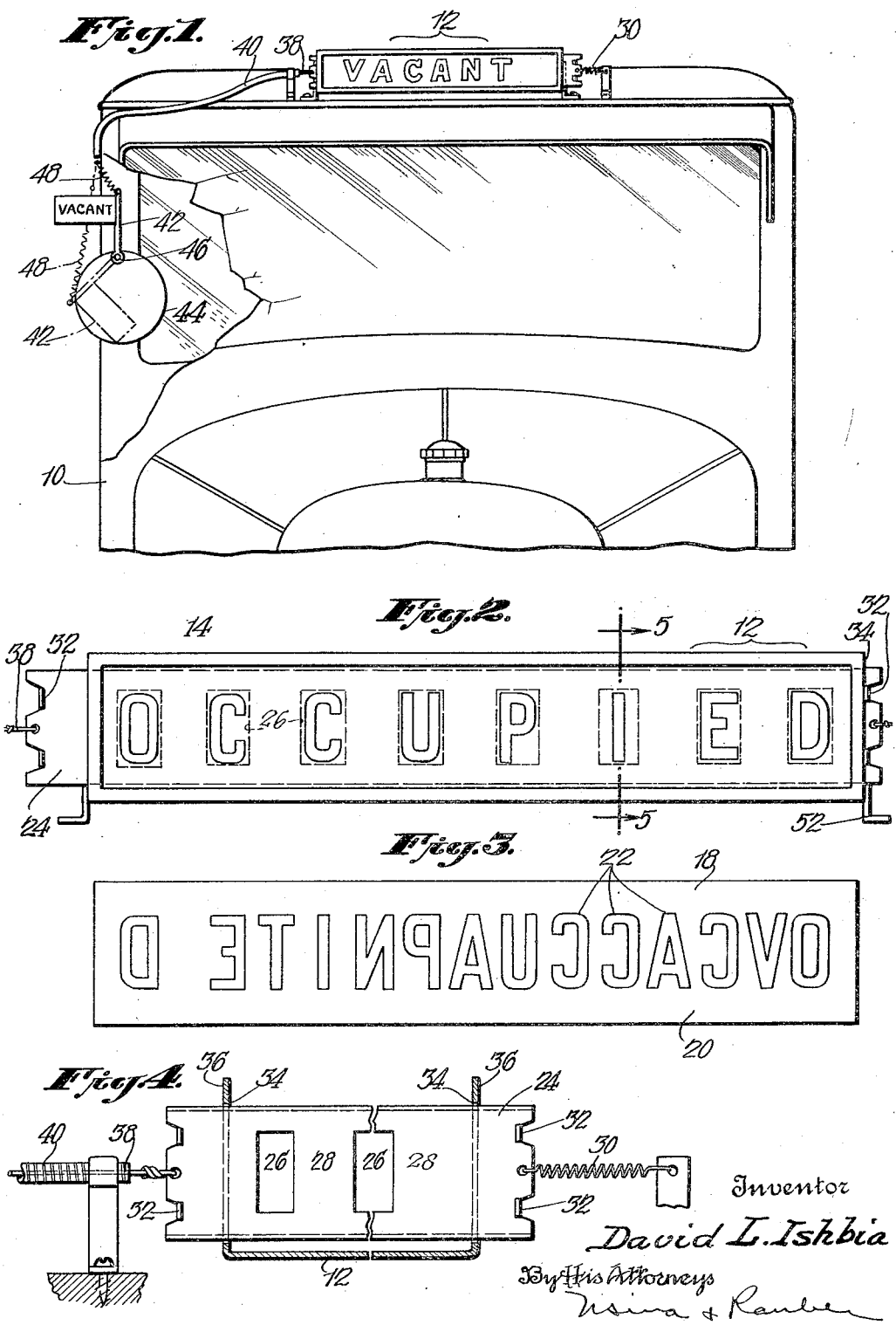

VARIABLE ILLUMINATED SIGN

Filed July 8, 1930  3 Sheets-Sheet 3

INVENTOR
David L. Ishbia
BY
ATTORNEYS

Patented Apr. 19, 1932

1,854,514

UNITED STATES PATENT OFFICE

DAVID L. ISHBIA, OF NEW YORK, N. Y.

VARIABLE ILLUMINATED SIGN

Application filed July 8, 1930. Serial No. 466,482.

This invention relates to an improvement in signs adapted particularly for use on taxicabs so as to indicate whether the same are occupied or vacant. The device includes means having two sets of transparent letters thereon, either set of which can be uncovered. For example, when the cab is vacant, the letters "V A C A N T" appear luminously. When the cab is occupied, the letters "O C C U P I E D" appear luminously. Means are provided so that the appropriate set of letters are uncovered automatically when the driver of the taxicab depresses the usual flag signal forming part of the standard taximeter. The invention will be fully apparent from the following specification when read in connection with the accompanying drawings and the features of novelty will be defined with particularity in the appended claims.

In the drawings:—

Fig. 1 is a front elevation of a portion of taxicab showing the application of my invention thereto;

Fig. 2 is a front elevation of a device embodying the invention;

Fig. 3 is a detached detail view of the sign having transparent and opaque portions;

Fig. 4 is a detail showing the construction of the shutter adapted to uncover selected sets of letters;

Fig. 5 is an enlarged section on line 5—5 of Fig. 2;

Fig. 6 is a front elevation of an alternative embodiment of the invention;

Fig. 7 is a transverse section on staggered line 7—7 of Fig. 6;

Fig. 8 is a detail view on line 8—8 of Fig. 7;

Figure 9:
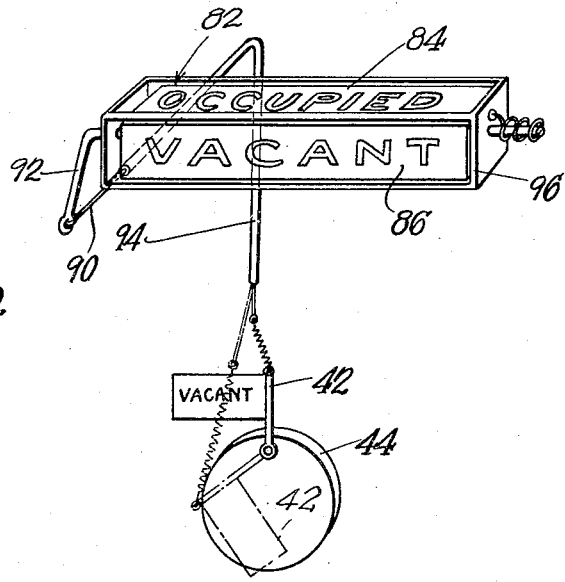
Fig. 9 is a view showing a modification.

Referring to the drawings, 10 represents a taxicab having mounted on the roof thereof my improved device indicated as a whole at 12. This device includes a casing 14, which supports a mirror or reflector 16 preferably disposed at an angle so as to reflect rays of the sun in the daytime. Opposite the reflector 16 and also inclined at an angle there is a sign 18 preferably, though not necessarily, of colored glass.

As shown in Fig. 3, this sign has an opaque background indicated at 20 and a number of transparent letters 22. In the embodiment illustrated, a piece of red colored crinkle glass is used and the background is formed by painting in such a way that the desired letters form transparencies. These letters are arranged in sets. One set of letters spell the word "Occupied", as indicated in Fig. 2. The other set of letters spell the word "Vacant". In order to selectively uncover either set of letters in the embodiment of Figs. 1 to 5 inclusive, I provide a shutter 24 having a number of cut-away portions 26 and alternate covering portions 28. A spring 30 pulls the shutter to such a position that the letters spelling the word "Vacant" are uncovered. When the shutter is pulled to the left in Figs. 2 and 4, the openings 26 expose to view the letters which spell the word "Occupied". The movement of the shutter is limited by lugs or stops 32 which engage the end 34 of the casing. The shutter slides through slits 34 formed in the end walls 36—36 of the casing. A flexible cable 38 is connected at one end of the shutter and passes through a suitable flexible tubing 40. This cable is operatively connected with the signal flag 42 of the taximeter 44, the flag being pivoted at 46. Interposed between the flag 42 and the flexible connection 38, there is a tension spring 48. As thus arranged, it will be understood that when the taximeter flag 42 is swung about its pivot 46, a pull will be exerted on the flexible member 38. This will be sufficient to shift the position of the shutter 24.

The purpose of the spring 48 is to compensate for different lengths of strokes of signal flags 42. For example, in some makes of taximeters, the flag is adapted to make a quarter of a turn and in others it makes a slightly greater movement, some meters employing flags which make almost a half turn. The spring 48 will of course be stronger than the spring 30 so that whenever the flag is turned from the upright vacant position to the down position, the shutter 24 will be shifted to expose to view the set of letters which indicate that the cab is occupied.

In daytime, the sign is illuminated by the sun shining on the mirror or reflector 18. The light will be projected through the transparent lettering as will be understood. At night, the sign will be illuminated by an electric light 50 as shown. The casing will be adjustably mounted on suitable brackets 52 secured to the roof of the cab, these brackets carrying pivot bearings 54.

In the embodiment of the invention illustrated in Figs. 1 to 4 inclusive, the sign is fixed and the shutter moves relatively thereto. In the modification shown in Figs. 5 to 8 inclusive, instead of using a movable shutter, I employ a flexible sign indicated as a whole at 56. This in practice is formed of coarsely woven netting which is relatively transparent. Over this is pasted a sheet of opaque material such as paper or cloth indicated at 58. The latter has cut out portions 60 which as indicated are letters spelling the word "Vacant". Similar cut-outs 62 at another location spell the word "Occupied".

The upper extremity of the flexible sign 56 is secured to a rotatably mounted roller 64 having a spring 66 normally tending to turn it clockwise, as indicated by the arrow in Fig. 7. A light rod 68 is secured to the lower end of the sign 56. Connected to this, there is a cord 38$^a$ which is adapted to be connected to the swingable flag signal 42 in substantially the same manner as the cord 38 above referred to. Located in juxtaposition to the flexible sign 56, there is a screen 70, the upper portion 72 of which is transparent and the lower portion of which has a covering such as a coat of paint or lacquer, indicated at 74, which makes it opaque. When the cord 38$^a$ is pulled down, the letters "O C C U P I E D" will be opposite the transparent portion 72 of the screen. When the taximeter flag signal 42 is lifted, the spring 66 will cause the roller to turn clockwise and therefore position the letters "V A C A N T" opposite the transparent portion 72 of the screen 70. It will be understood that the latter letters, in the position of Figs. 6 and 7, are behind the opaque part 74. The design of these figures is also provided with an electric light 50$^a$ and a reflector 16$^a$ substantially the same as those shown in Fig. 5.

For protecting the device against the elements, a hinged roof or cover 76 is provided. This may be swung open during the daytime so that the sunlight will be reflected through the transparent parts of the sign. In bad weather, the cover can be closed. It will also be closed at night when illumination is furnished by the light 50$^a$. The socket for the light is supported by an inverted channel member 78 which spaces the same away from the bottom of the casing. This channel member also forms an enclosure for the electric wiring and shields it from any moisture which may enter the casing. To prevent accumulation of rain water, the casing will be provided with drain holes, indicated at 80.

Fig. 9 illustrates a further modification in which I show a rotatably mounted sign 82 having at least two faces 84 and 86. On the face 84, I provide the letters "O C-C U P I E D", on the face 86 the letters "V A C A N T" are provided. The sign 82, for example, may be of rectangular section and the letters painted thereon. A spring 88 tends to turn the sign to such a position that the word "Vacant" is visible. A stop 90 limits the turning movement, this stop coacting, for example, with an arm 92. This arm 92 is connected by means of a cable 94 with the signal flag 42 of the taximeter 44. Thus, it will be understood that when the flag is swung, from the upright vacant position shown, downwardly to the occupied position, the sign will be turned so that the word "Occupied" will be visible. In this embodiment of the invention, the lettering need not be transparent. The sign will be mounted in a suitable casing 96 with a window therein of sufficient size to display the lettering.

Figure 10:
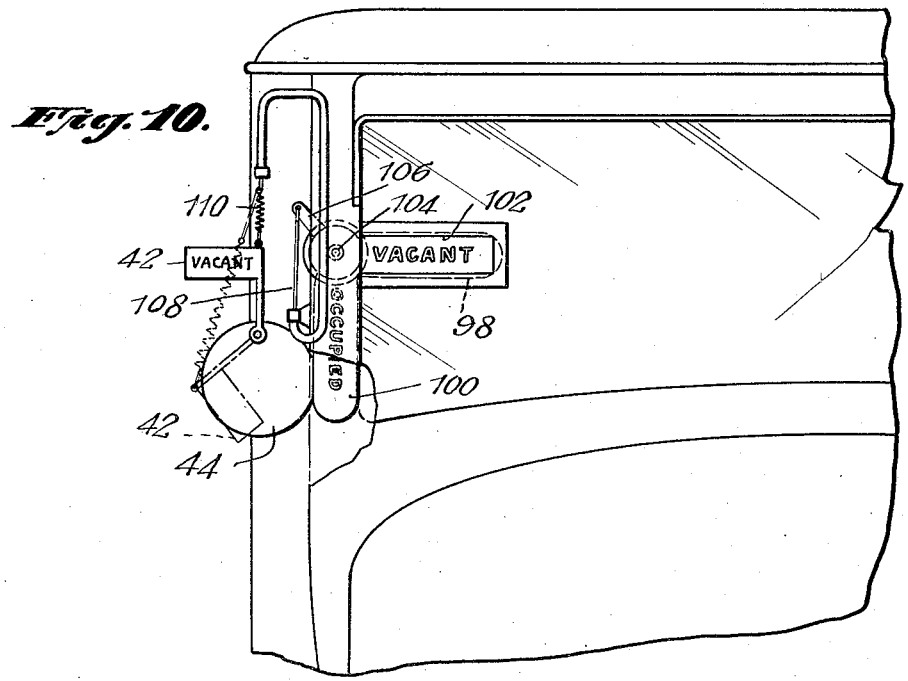
Fig. 10 is a view showing another modification.

Fig. 10 illustrates another modification in which I provide a sign having two semaphore arms 98 and 100 adapted to be alternately exposed to view through a window 102. This sign is pivoted at 100 on a suitable fixed support and carries an arm 106 which is connected by means of a flexible member 108 and spring 110 with the signal flag 42 of the taximeter 44. With this arrangement, one arm will have the word "Vacant" printed thereon as indicated at 98 and will be exposed to view when the taximeter signal flag 42 is in upright position. When the flag is swung down, a pull will be exerted on the member 108. This will bring the arm 100 carrying the word "Occupied" into register with the window 102.

While the specific embodiments of the invention have been defined with great particularity it is not to be construed that I am limited thereto since various modifications may be made without departing from the invention as defined in the appended claims.

What I claim is:

1. In combination with a taximeter having a swingable flag signal thereon, an illuminated device adapted to indicate whether the taxicab is vacant or occupied, said device including a sign having two sets of transparent letters, means for reflecting light through said letters, a shutter for covering and uncovering either set of letters, a spring pulling the shutter in one direction; and a flexible connection including an extensible member connected with said flag signal for moving said shutter in the opposite direction.

2. In combination with a taximeter having a movable signal thereon, a device adapted to indicate whether the taxicab is vacant or occupied including a movable sign having two sets of letters thereon, motion transmitting means responsive to the movements of said signal for moving the sign so as to alternately expose one set of letters to view, and compensating means connected between the movable signal and said transmitting means adapted to compensate for variations in the stroke of said signal.

3. A device adapted for use on a taxicab adapted to show whether it is occupied or vacant including an upwardly and outwardly flaring casing supporting an upwardly and outwardly inclined sign having two sets of transparent letters thereon, an oppositely inclined reflector supported by said casing, the casing being open at the top so as to admit natural light which is adapted to be reflected through said transparent letters, a shutter interposed between the reflector and the sign and mounted for slidable movement relatively thereto, said shutter having interrupted portions adapted to alternately cover and uncover different letters on said sign, a taximeter having a signal flag mounted for movement thereon, means tending to move said shutter in one direction and means for transmitting movement from said signal flag to said shutter in the opposite direction.

4. A device adapted for use on a taxicab adapted to show whether it is occupied or vacant, including a casing whose walls flare upwardly and outwardly, a sign supported by said casing and inclined upwardly and outwardly and having two sets of transparent letters thereon, a mirror-like reflector supported by said casing, a shutter interposed between the reflector and the sign and mounted for slidable movement relatively thereto, a light between the shutter and said reflector, said shutter having interrupted portions adapted to alternately cover and uncover different sets of said transparent letters, a taximeter having a signal flag mounted for pivotal movement, and means for transmitting movement from said flag to said shutter.

In witness whereof, I have hereunto signed my name.

DAVID L. ISHBIA.